(12) United States Patent
Tahara et al.

(10) Patent No.: US 7,525,220 B2
(45) Date of Patent: Apr. 28, 2009

(54) MULTI-INPUT POWER SUPPLY CIRCUIT, AND METHOD OF SWITCHING POWER SUPPLIES OF THE SAME

(75) Inventors: Hiromitsu Tahara, Tokyo (JP); Takanori Mutou, Tokyo (JP)

(73) Assignee: NEC Corporation, Tokyo (JP)

( * ) Notice: Subject to any disclaimer, the term of this patent is extended or adjusted under 35 U.S.C. 154(b) by 182 days.

(21) Appl. No.: 11/392,576

(22) Filed: Mar. 30, 2006

(65) Prior Publication Data

US 2006/0220466 A1    Oct. 5, 2006

(30) Foreign Application Priority Data

Mar. 31, 2005    (JP) .............................. 2005-102807

(51) Int. Cl.
*H02J 1/00*    (2006.01)
(52) U.S. Cl. ........................................ 307/85
(58) Field of Classification Search .................. 307/51, 307/65, 70, 72, 80, 82, 83, 85, 141.8; 323/271; 363/37
See application file for complete search history.

(56) References Cited

U.S. PATENT DOCUMENTS 3,769,571 A * 10/1973 Wilkinson ................... 363/134
3,873,846 A * 3/1975 Morio et al. .................. 307/23
5,994,793 A * 11/1999 Bobry ........................... 307/64
6,738,270 B2 * 5/2004 Saga et al. ..................... 363/50
6,833,635 B2 * 12/2004 Kippley ........................ 307/83
7,352,082 B2 * 4/2008 Marwali et al. .............. 307/52
2005/0040711 A1 * 2/2005 West ............................ 307/82

FOREIGN PATENT DOCUMENTS

| JP | 7-009089 | 2/1995 |
|---|---|---|
| JP | 11-089113 | 3/1999 |
| JP | 2002-233079 A | 8/2002 |

* cited by examiner

*Primary Examiner*—Stephen W Jackson
*Assistant Examiner*—Daniel Cavallari
(74) *Attorney, Agent, or Firm*—Foley & Lardner LLP

(57) ABSTRACT

A multi-input power supply circuit includes a plurality of power supplies such as an alternating-current power supply, a direct-current power supply, and two batteries; a transformer including windings corresponding to the plurality of power supplies; switching devices for performing switching operations and transistors for preventing inverse currents, the switching devices and the transistors being connected in series to the windings, respectively; and a control circuit for controlling the switching operations of the switching devices and on and off operations of the transistors. The windings include those windings configured to form primary windings and a winding configured to form a load winding.

7 Claims, 3 Drawing Sheets

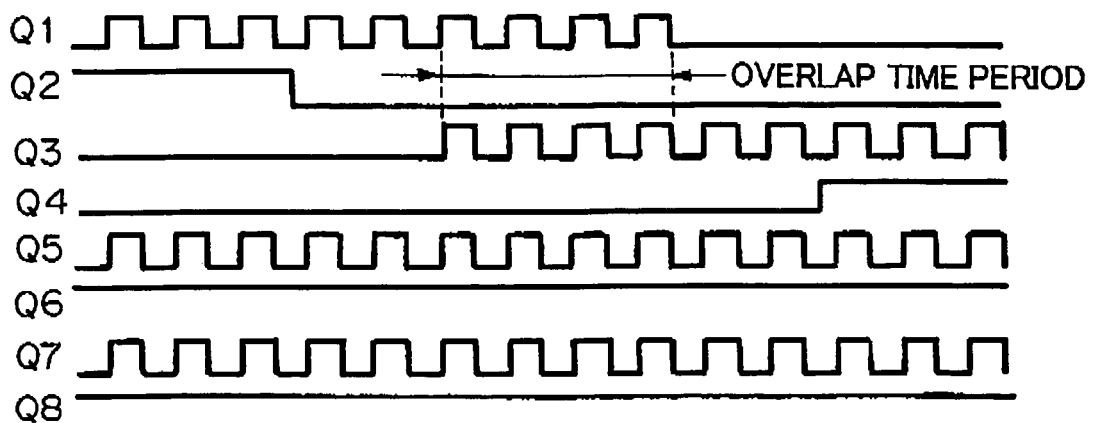
FIG.3
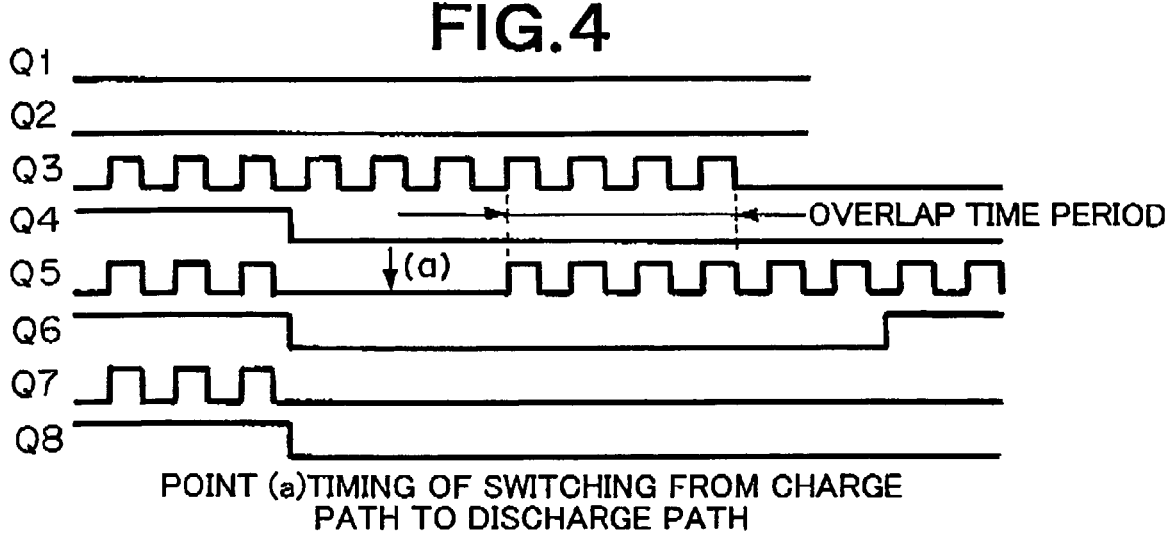
POINT (a) TIMING OF SWITCHING FROM CHARGE PATH TO DISCHARGE PATH
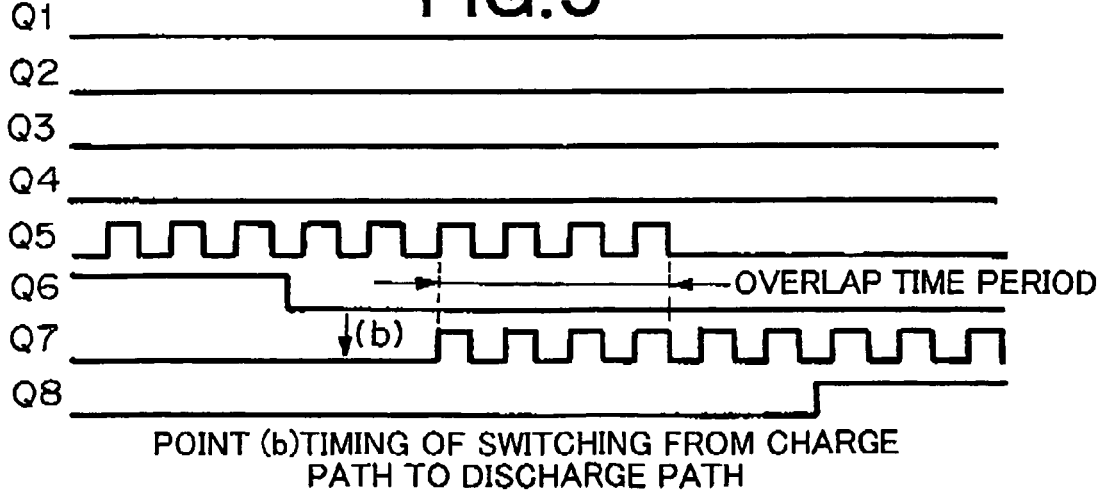
POINT (b) TIMING OF SWITCHING FROM CHARGE PATH TO DISCHARGE PATH

MULTI-INPUT POWER SUPPLY CIRCUIT, AND METHOD OF SWITCHING POWER SUPPLIES OF THE SAME

BACKGROUND OF THE INVENTION

1. Field of the Invention

This invention relates to a multi-input power supply circuit and a method of switching power supplies of the multi-input power supply circuit and particularly, to a multi-input power supply circuit including one transformer that has windings corresponding to a plurality of power supplies and a method of switching the power supplies of the multi-input power supply circuit.

2. Description of the Related Art

There is a multi-input power supply circuit provided with a plurality of power supply inputs, which include both an AC 100 V alternating-current input and a 12 V direct-current input, for example. For instance a power supply circuit including one transformer provided with windings corresponding to a plurality of power supplies is described in Japan Utility Model Publication No 07-009089 (FIG. 1 and Paragraph [0012]), JP-A-2002-233079 (Paragraph [0011] and FIG. 3), and JP-A-11-089113 (FIG. 6 and Paragraphs [0003] to [0005]). Further, JP-A-2002-233679 describes a technique of overlapping switching operations when switching is made among a plurality of power supply inputs.

In this type of multi-input power supply circuit, input power supplies are required to have high dielectric strength in some cases, depending on types of the input power supplies.

The conventional multi-input power supply circuit characterized by having one transformer has a disadvantage in that insulation cannot be performed when an attempt is made to supply electric power to a load circuit without a momentary interruption. Meanwhile, if a plurality of insulated windings and switching circuits are used to secure insulation, a delay time is generated when switching is made among switching systems, and thus prevention of the momentary interruption cannot be achieved.

Further, if the delay time caused by the switching is reduced too much, there arises a time period in which switching devices of two or more switching systems are turned ON at the same time. This causes a disadvantage in that the electric power returns to an input system of another system, the electric power is not normally supplied to the load circuit, and thus the momentary interruption of the electric power supply is caused.

Furthermore, another type of circuit including a combination of a plurality of converters has problems in that the size of the circuit is increased and in that efficiency of the circuit is decreased.

SUMMARY OF THE INVENTION

According to a first aspect of the present invention, a multi-input power supply circuit includes: a plurality of power supplies; a transformer including windings corresponding to the plurality of power supplies; switching devices for performing switching operations and transistors for preventing inverse currents, the switching devices and the transistors being connected in series to the windings of the transformer, respectively; and a control circuit for controlling switching operations of the switching devices and ON and OFF operations of the transistors.

According to a second aspect of the present invention, a power supply switching-method is used for switching power supplies of a multi-input power supply circuit which includes a plurality of power supplies, a transformer including windings corresponding to the plurality of power supplies, and switching devices for performing switching operations and transistors for preventing inverse currents, the switching devices and the transistors being connected in series to the windings, respectively. The power supply switching method includes the step of switching from one of the plurality of power supplies to another one of the plurality of power supplies by turning on one of the transistors corresponding to the another one of the plurality of power supplies after stopping a switching operation of one of the switching devices corresponding to the one of the plurality of power supplies.

According to a third aspect of the present invention, a power supply switching-method is used for switching power supplies of a multi-input power supply circuit which includes a plurality of power supplies, a transformer including windings corresponding to the plurality of power supplies, and switching devices for performing switching operations and transistors for preventing inverse currents, the switching devices and the transistors being connected in series to the windings, respectively. The power supply switching method includes the step of switching from one of the plurality of power supplies to another one of the plurality of power supplies by starting a switching operation of one of the switching devices corresponding to the another one of the plurality of power supplies after turning off one of the transistors corresponding to the one of the plurality of power supplies.

According to a fourth aspect of the present invention, a power supply switching-method for switching power supplies of a multi-input power supply circuit that includes a plurality of power supplies, a transformer including windings corresponding to the plurality of power supplies, and switching devices for performing switching operations and transistors for preventing inverse currents, the switching devices and transistors being connected in series to the windings, respectively. The power supply switching-method comprising the step of switching from one of the plurality of power supplies to another one of the plurality of power supplies by performing, for a predetermined time period, switching operations of both one of the switching devices corresponding to the one of the plurality of power supplies and another one of the switching devices corresponding to the another one of the plurality of power supplies.

According to the present invention, in the transformer having the plurality of windings, each of the plurality of windings is connected to a switching device that perform a switching operation and to a transistor that prevent an inverse current. Further, the operations of the switching devices and transistors of the plurality of windings are controlled in combination. Thereby, return of current to an input is prevented, and thus a voltage drop loss caused by a switching current can be suppressed.

BRIEF DESCRIPTION OF THE DRAWINGS

FIG. 3 is a timing chart illustrating an example of control of the gates of respective FETs performed in a change from State 2 to State 3;

FIG. 4 is a timing chart illustrating an example of control of the gates of the respective FETs performed in a change from State 3 to State 4; and FIG. 5 is a timing chart illustrating an example of control of the gates of the respective FETs performed in a change from State 4 to State 5.

DETAILED DESCRIPTION OF THE PREFERRED EMBODIMENTS

An embodiment of the present invention will be described in detail below by referring to the accompanying drawings.

Figure 1:
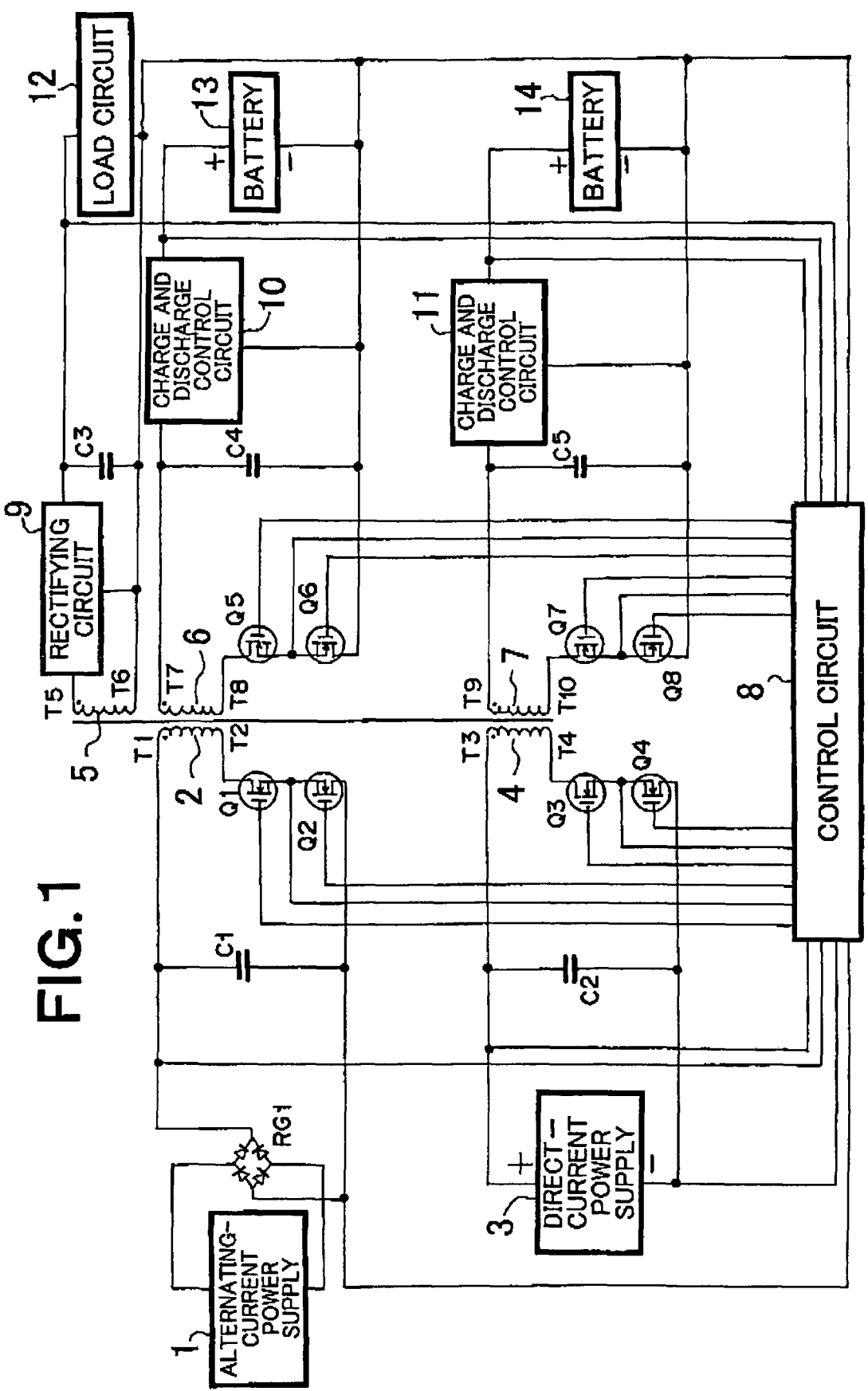
FIG. 1 is a diagram illustrating a circuit configuration of a multi-input power supply circuit according to an embodiment of the present invention.

FIG. 1 is a diagram illustrating a circuit configuration of a multi-input power supply circuit according to the embodiment of the present invention. The multi-input power supply circuit has two primary input supplies of an alternating-current input supply and direct-current input supply, and two battery power supplies.

A multi-input power supply circuit according to the present embodiment includes both an alternating-current input formed by an alternating-current power supply 1 having a voltage of AC 100 V, and a direct-current input formed by a direct-current power supply 3 having a voltage of 12 V. The multi-input power supply circuit further includes different batteries 13 and 14 as back-up power supplies for the event of an electric power outage.

Two insulated windings 2 and 4, which are prepared for the alternating-current input and the direct-current input, respectively, are provided with a drive circuit including two FETs Q1 and Q2 and a drive circuit including two FETs Q3 and Q4, respectively. When an input voltage is equal to or higher than a threshold value set for enabling operation, a switching operation of either one of the FETs Q1 and Q3 is performed, and electric power is supplied to a load circuit 12 via an output winding 5 of the load circuit 12 and a rectifying circuit 9. Further, FETs Q6 and Q8, which are prepared for driving batteries, are operated to function as rectifying devices for charging the batteries 13 and 14 at the same time.

The batteries 13 and 14 may be the same as or different from each other in their nominal voltages.

When the input voltage falls below the threshold value, the switching operation of either one of the FETs Q1 and Q3 on the input side is stopped. Further, switching operations of FETS Q5 and Q7, which are connected to windings of the batteries 13 and 14, respectively, are performed. Thereby, the batteries 13 and 14 are used as their power sources and electric power is continuously supplied to the load circuit 12.

Further, a time period in which switching operations of two or more systems are overlapped is set in switching between the switching operations. Thereby, the electric power can be supplied to the load circuit 12 without a momentary interruption.

An end T2 of the winding 2 (i.e., T1-T2. T1 and T2 indicate both ends of the winding 2. The same applies to ends T3-T4, T5-T6, T7-T8 and T9-T10 of windings 4, 5, 6 and 7, which will be later described.) of a power supply transformer is connected to the FET Q1 that generates a pulse current and to the FET Q2 that regulates the direction of the current. A rectifying circuit RG1 connected to the alternating-current power supply 1 is connected to the end T1 of the winding 2 and to the drain of the FET Q2. Further, a smoothing condenser C1 is connected between the end T1 of the winding 2 and the drain of the FET Q2.

The end T4 of the winding 4 (T3-T4) of the power supply transformer is connected to the FET Q3 that generates a pulse current and to the FET Q4 that regulates the direction of the current. The direct-current power supply 3 is connected to the end T3 of the winding 4 and to the drain of the FET Q4. Further, a condenser C2 is connected between the end T3 of the winding 4 and the drain of the FET Q4.

The end T8 of the winding 6 (T7-T8) of the power supply transformer is connected to the FET Q5 that generates a pulse current in the winding 6 (T7-T8) of the power supply transformer when the battery 13 performs a battery backup operation, and to the FET Q6 that regulates the direction of the current. A charge and discharge control circuit 10 connected to the battery 13 is connected to the end T7 of the winding 6 and to the drain of the FET Q6. Further, a condenser C4 is connected between the end T7 of the winding 6 and the drain of the FET Q6.

The end T10 of the winding 7 (T9-T10) of the power supply transformer is connected to the FET Q7 that generates a pulse current in the winding 7 (T9-T10) of the power supply transformer when the battery 14 performs a battery backup operation, and to the FET Q8 that regulates the direction of the current. A charge and discharge control circuit 11 connected to the battery 14 is connected to the end T9 of the winding 7 and to the drain of the FET Q8. Further, a condenser C5 is connected between the end T9 of the winding 7 and the drain of the FET Q8.

The respective windings 2 (T1-T2), 4 (T3-T4), 6 (T7-T8), 7 (T9-T10) are configured to form primary windings with respect to the winding 5 (T5-T6) of the load circuit. The end T5 that forms an end of the winding 5 is connected to an end of the rectifying circuit 9. Further, a condenser C3 is connected between the other end of the rectifying circuit 9 and the end T6 that forms the other end of the winding 5.

Voltages of the alternating-current power supply 1, direct-current power supply 3, battery 13, and battery 14 are monitored, and the FETs Q1 to Q8 are controlled by a control circuit 8. The pulse width of each of the FETs connected to the primary windings is configured to be stabilized by detecting a voltage supplied to the load circuit 12 and performing a duty ratio control such as pulse width modulation (PWM) and frequency modulation (FM).

In the present embodiment, two FETs forming a pair are connected such that the respective sources of the two FETs are connected to each other. Alternatively, if the two FETs can be connected such that an arrangement of the drain and source of one FET is reverse to an arrangement of the drain and source of the other FET, and ON and OFF operations of the respective FETs can be performed, the connection of the FETs is not limited to any particular connection order.

Figure 2:
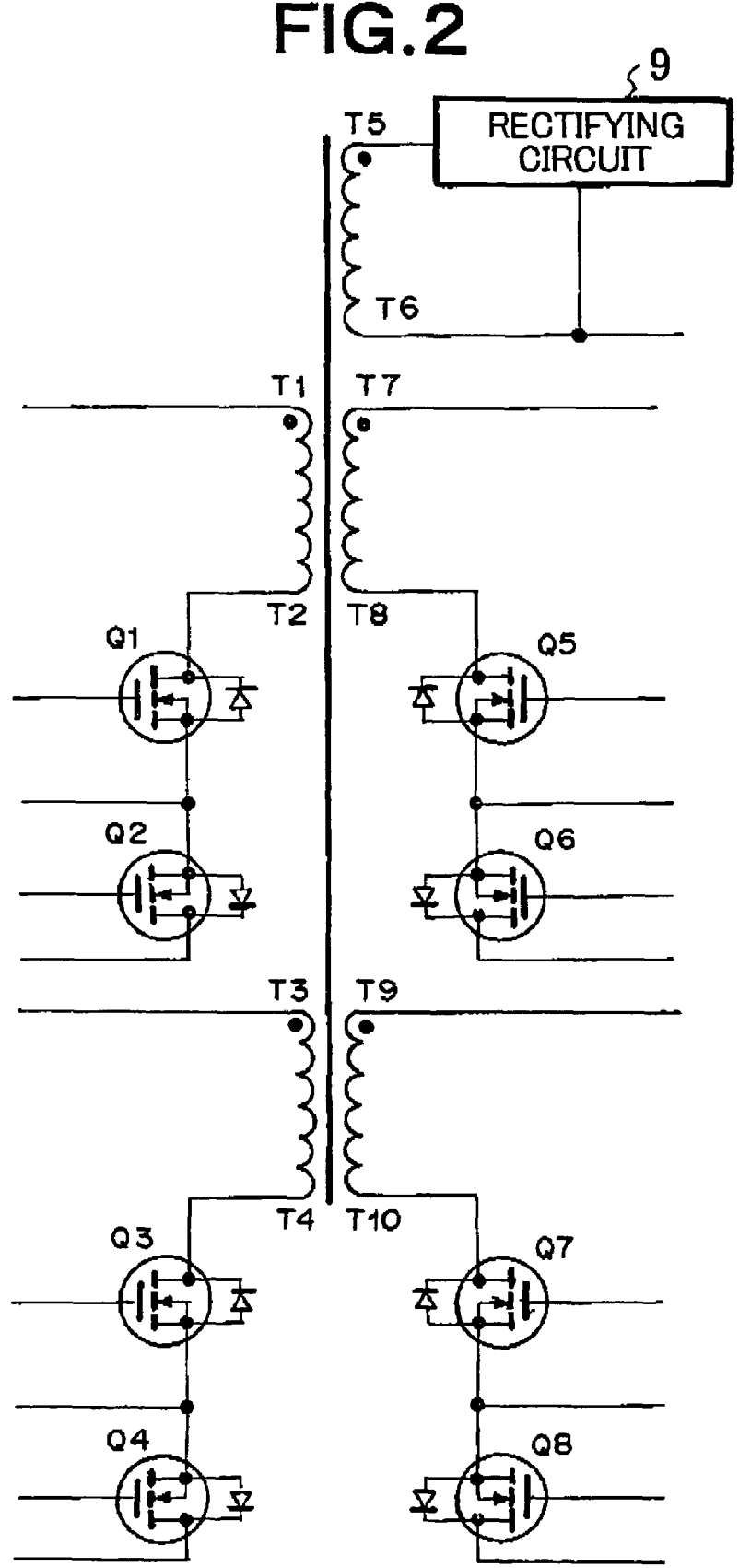
FIG. 2 is an enlarged view of a part of the multi-input power supply circuit shown in FIG. 1.

In the embodiment illustrated in FIG. 1, parasitic diodes are formed in the directions shown in FIG. 2 due to a characteristic of the FET.

In the operation of the embodiment illustrated in FIG. 1, when input voltages of all of the power supplies are within respective operable voltage ranges, the winding forming the primary winding is determined in accordance with a priority order determined by the control circuit 8. Therefore, there are a plurality of operation patterns. TABLE 1 illustrates operations of the respective FETs performed when the alternating-current power supply (ACPS) is given priority as the power supply, and the battery 13 is given priority as the battery used as the backup operation.

TABLE 1

|  | State 1 | State 2 | State 3 | State 4 | State 5 | State 6 |
|---|---|---|---|---|---|---|
| ACPS | ≧TH | ≧TH | <TH | <TH | <TH | <TH |
| DCPS | ≧TH | <TH | ≧TH | <TH | <TH | <TH |
| Battery 13 | ≧TH | ≧TH | ≧TH | ≧TH | <TH | <TH |
| Battery 14 | ≧TH | ≧TH | ≧TH | ≧TH | ≧TH | <TH |
| Q1 | SW | SW | OFF | OFF | OFF | OFF |
| Q2 | ON | ON | OFF | OFF | OFF | OFF |
| Q3 | OFF | OFF | SW | OFF | OFF | OFF |

TABLE 1-continued

|    | State 1 | State 2 | State 3 | State 4 | State 5 | State 6 |
|----|---------|---------|---------|---------|---------|---------|
| Q4 | OFF     | OFF     | ON      | OFF     | OFF     | OFF     |
| Q5 | SW*1    | SW*1    | SW*2    | SW      | OFF     | OFF     |
| Q6 | ON      | ON      | ON      | ON      | OFF     | OFF     |
| Q7 | SW*1    | SW*1    | SW*2    | OFF     | SW      | OFF     |
| Q8 | ON      | ON      | ON      | OFF     | ON      | OFF     |

*Note 1: A synchronous rectifying operation is performed in accordance with the operation of the FET Q1 (generation of a charging voltage source for the batteries 13 and 14).
*Note 2: A synchronous rectifying operation is performed in accordance with the operation of the FET Q3 (generation of a charging voltage source for the batteries 13 and 14).
*Note 3: TH refers to the threshold value.

In State 1, there are inputs from all of the power supplies. In State 2, there is no input only from the direct-current power supply (DCPS) 3. In State 3, there is no input only from the alternating-current power supply 1. In State 4, there is no input from both of the alternating-current power supply 1 and the direct-current power supply 3. In State 5, there is an input only from the battery 14. In State 6, even the power of the battery 14 is exhausted, and therefore there is no input from all of the power supplies.

In the example shown in TABLE 1, the alternating-current power supply 1 is given priority as the power supply. Thus, in a change from State 1 to State 2 in which there is no input only in the direct-current power supply 3, there is no change in the operations of the respective FETs.

In a change from State 2 to State 3, switching is made from the alternating-current power supply 1 to the direct-current power supply 3. When the input voltage of the alternating-current power supply 1 falls below a set threshold value, as illustrated in FIG. 3, the FET Q2 is previously turned OFF before a switching operation of the FET Q3 is started. Thereby, an inflow of electric power from the direct-current power supply 3 to the alternating-current power supply 1 is prevented. The inflow is caused upon start of the switching operation of the FET Q3. Accordingly, transmission of electric power to the load circuit 12 can be certainly performed. In this way, the FET Q2 is turned OFF before the switching operation of the FET Q3 is started. In this process, a time period is set in which the FETs Q1 and Q3 perform the respective switching operations in synchronization with each other. Thereby, the momentary interruption of the electric power supply to the load circuit 12 is prevented. During the time period in which the FETs Q1 and Q3 perform the respective switching operations in synchronization with each other, the electric power is supplied to the load circuit 12 through a supply winding of lower impedance.

After the switching operation of the FET Q1 is stopped, the FET Q4 which prevents the inverse current is turned ON to suppress the voltage drop loss caused by the switching current flowing via the parasitic diode of the FET Q4.

Then, switching operations of the FETs Q5 and Q7 are performed, and the FETs Q6 and Q8 are turned ON. Thereby, charging of the batteries 13 and 14 is performed.

In a change from State 3 to State 4, switching is made from the direct-current power supply 3 to the battery 13. When the input voltage of the direct-current power supply 3 falls below a set threshold value, as illustrated in FIG. 4, the FET Q4 is previously turned OFF before a switching operation of the FET Q5 is started. Thereby, an inflow of electric power from the battery 13 to the direct-current power supply 3 is prevented. The inflow is caused upon start of the switching operation of the FET Q5. Accordingly, the transmission of electric power to the load circuit 12 can be certainly performed. In this way, the FET Q4 is turned OFF before the switching operation of the FET Q5 is started. In this process, a time period is set in which the FETs Q3 and Q5 perform the respective switching operations in synchronization with each other. Thereby, the momentary interruption of the electric power supply to the load circuit 12 is prevented. During the time period in which the FETs Q3 and Q5 perform the respective switching operations in synchronization with each other, the electric power is supplied to the load circuit 12 through a supply winding of lower impedance.

After the switching operation of the FET Q3 is stopped, the FET Q6 that prevents the inverse current is turned ON to suppress the voltage drop loss caused by the switching current flowing via the parasitic diode of the FET Q6.

A point (a) shown in FIG. 4 indicates a timing of switching from a charge path to a discharge path in the charge and discharge control circuit 10.

In a change from State 4 to State 5, switching is made from the battery 13 to the battery 14. When the input voltage of the battery 13 falls below a set threshold value, the FET Q6 is previously turned OFF before the switching operation of the FET Q7 is started. Thereby, an inflow of electric power from the battery 14 to the battery 13, which is caused upon start of the switching operation of the FET Q7, is prevented. Accordingly, the transmission of electric power to the load circuit 12 can be certainly performed. In this way, the FET Q6 is turned OFF before the switching operation of the FET Q7 is started. In this process, a time period is set in which the FETs Q5 and Q7 perform the respective switching operations in synchronization with each other. Thereby, the momentary interruption of the electric power supply to the load circuit 12 is prevented. During the time period in which the FETs Q5 and Q7 perform the respective switching operations in synchronization with each other, the electric power is supplied to the load circuit 12 through a supply winding of lower impedance.

After the switching operation of the FET Q5 is stopped, the FET Q8 that prevents the inverse current is turned ON to suppress the voltage drop loss caused by the switching current flowing via the parasitic diode of the FET Q8.

A point (b) shown in FIG. 5 indicates a timing of switching from a charge path to a discharge path in the charge discharge control circuit 11.

If at least either one of the input voltages of the alternating-current power supply 1 and the input voltage of the direct-current power supply 3 is equal to or higher than the set threshold value, either one of the FETs Q1 and Q3 performs the switching operation, as described above. Thus, the electric power is supplied to the load circuit 12. If the switching operations of the FETs Q5 and Q7 are performed in synchronization with either one of that of the FETs Q1 and Q3, the FETs Q5 and Q7 form rectifying circuits with the condensers C4 and C5, respectively. Thereby, electric charging power is supplied to the charge and discharge control circuits 10 and 11, respectively.

When the system including the FET Q6 does not contribute to electric charging operation, the FET Q6 is turned OFF, and when the system including the FET Q8 does not contribute to electric charging operations, the FET Q8 is turned OFF. Thereby, the electric power supply to the corresponding charge and discharge control circuit is stopped, and thus consumption of stand-by electric power is prevented.

If the voltage of each of the condensers C4 and C5 is equal to or higher than a set threshold value, the corresponding one of the charge and discharge control circuits 10 and 11 performs control to switch to a direction of charging the corresponding battery. Meanwhile, if the voltage of each of the condensers C4 and C5 is equal to or lower than another set threshold value, the corresponding one of the charge and discharge control circuits 10 and 11 performs control to switch to a direction of discharging the corresponding battery.

According to the present embodiment, a plurality of input sources that need to be insulated can be constantly connected and also can be used when necessary. Further, according to the present embodiment, during the switching operation of an FET connected to a certain system, the electric power is prevented from returning to the inputs of the other systems except the battery charging system. Therefore, the power supply to the load circuit can be certainly performed. Furthermore, according to the present embodiment, a plurality of batteries of different voltages can be constantly connected and also can be used when necessary.

Further, according to the present embodiment, a plurality of inputs can be connected by means of one transformer. Therefore, the size of the circuit can be reduced. Furthermore, according to the present embodiment, one winding serves both as a charge winding and a discharge winding of an individual battery. Thus, the transformer can be simply designed. Moreover, according to the present embodiment, the devices that prevent the return of electric power to the inputs (i.e., the FETs Q2 and Q4) can reduce the power loss caused by the forward voltage drop, compared with those devices using diodes.

In the embodiment described above, the FET Q2 may be moved to a position on the end T1 side of the winding 2 (T1-T1). The same applies to the FETs Q4, Q6, and Q8. Further, the FETs, which are N-channel transistors in the circuit of the present embodiment, may be replaced by P-channel transistors. Furthermore, the FETs Q6 and Q8 can be removed from the circuit of the present embodiment. Moreover, the number of systems of the input power supplies and the batteries may be either increased or decreased. Further, the input power supplies and the batteries may be combined. Such combinations include a combination of an alternating-current power supply and a direct-current power supply, and a combination of either one of the alternating-current power supply and direct-current power supply and a battery, for example.

The multi-input power supply circuit according to the embodiment can be used in an industrial uninterruptible power supply, a mobile device (e.g., a device of a multiple battery system including a nickel hydride battery, a lithium battery, a dry battery, and the like), a device for both home use and in-car use (e.g., a detachable car navigation system device), and so forth.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A multi-input power supply circuit comprising:
    a plurality of power supplies;
    a transformer including windings corresponding to said plurality of power supplies;
    switching devices for performing switching operations and transistors for preventing inverse currents, said switching devices and transistors being connected in series to said windings, respectively; and
    a control circuit for controlling switching operations of said switching devices and on and off operations of said transistors,
    wherein,
    in switching from one of said plurality of power supplies to another one of said plurality of power supplies, said control circuit performs, for a predetermined time period, switching operations of both one of said switching devices corresponding to the one of said plurality of power supplies and another one of said switching devices corresponding to the another one of said plurality of power supplies.

2. The multi-input power supply circuit according to claim 1, wherein,
    in switching from the one of said plurality of power supplies to the another one of said plurality of power supplies, said control circuit turns on the one of said transistors corresponding to the another one of said plurality of power supplies after stopping a switching operation of the one of said switching devices corresponding to the one of said plurality of power supplies.

3. The multi-input power supply circuit according to claim 1, wherein,
    in switching from the one of said plurality of power supplies to the another one of said plurality of power supplies, said control circuit starts a switching operation of the one of said switching devices corresponding to the another one of said plurality of power supplies after turning off the one of said transistors corresponding to the one of said plurality of power supplies.

4. The multi-input power supply circuit according to claim 1, wherein
    said plurality of power supplies include a battery and at least one of an alternating-current power supply and a direct-current power supply.

5. A power supply switching-method for switching power supplies of a multi-input power supply circuit that includes a plurality of power supplies, a transformer including windings corresponding to said plurality of power supplies, and switching devices for performing switching operations and transistors for preventing inverse currents, said switching devices and transistors being connected in series to said windings, respectively, said power supply switching-method comprising the step of:
    switching from one of said plurality of power supplies to another one of said plurality of power supplies by performing, for a predetermined time period, switching operations of both one of said switching devices corresponding to the one of said plurality of power supplies and another one of said switching devices corresponding to the another one of said plurality of power supplies.

6. A power supply switching-method according to claim 5, further comprising the step of switching from the one of said plurality of power supplies to the another one of said plurality of power supplies by turning on the one of said transistors corresponding to the another one of said plurality of power supplies after stopping a switching operation of the one of said switching devices corresponding to the one of said plurality of power supplies.

7. A power supply switching-method according to claim 5, further comprising the step of switching from the one of said plurality of power supplies to the another one of said plurality of power supplies by starting a switching operation of the one of said switching devices corresponding to the another one of said plurality of power supplies after turning off the one of said transistors corresponding to the one of said plurality of power supplies.

* * * * *